SUPPORT DEVICE

Filed June 30, 1958 5 Sheets-Sheet 1

INVENTORS.
LEONARD J. POCH
ROBERT R. SCHAFFER
BY Donald F. Voss
ATTORNEY

SUPPORT DEVICE

Filed June 30, 1958

5 Sheets-Sheet 2

United States Patent Office 3,034,110
Patented May 8, 1962

3,034,110
SUPPORT DEVICE

Leonard J. Poch, Montrose, Pa., and Robert R. Schaffer, Endicott, N.Y., assignors to International Business Machines Corporation, New York, N.Y., a corporation of New York Filed June 30, 1958, Ser. No. 745,759
5 Claims. (Cl. 340—174.1)

Figure 1:
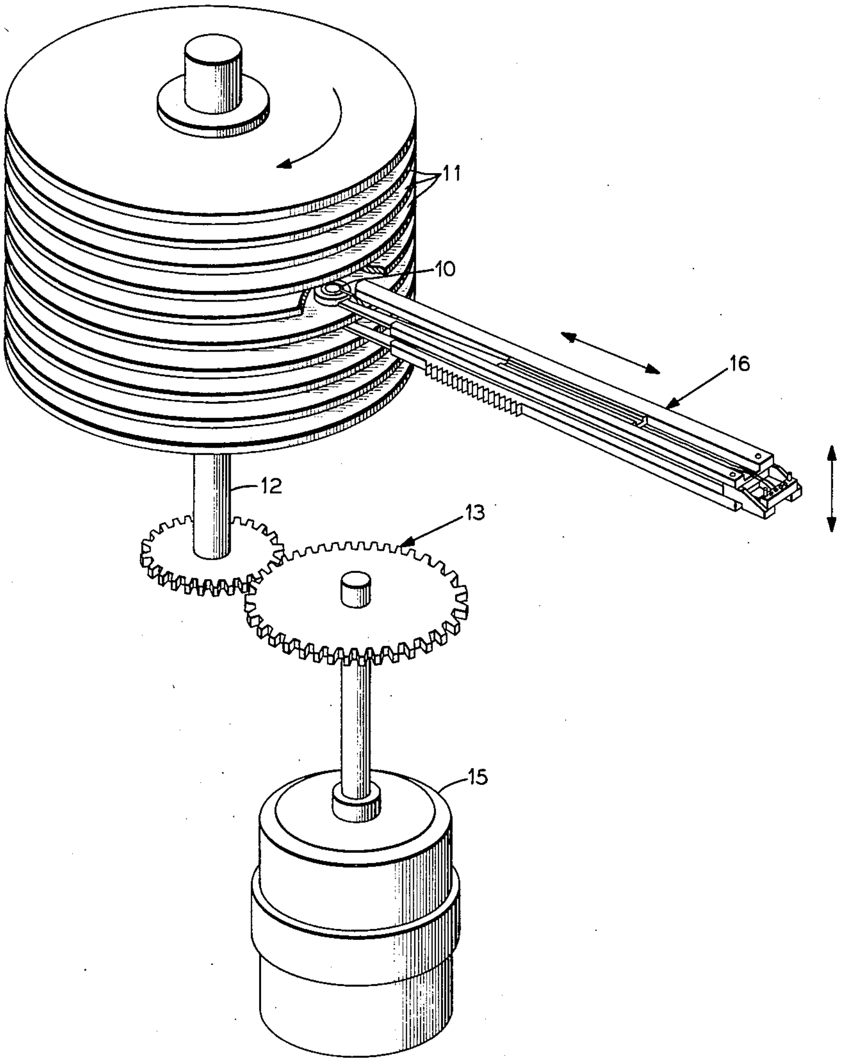

This invention relates generally to apparatus for supporting magnetic heads and, particularly, to apparatus for poising magnetic heads with respect to rapidly moving magnetizable surfaces and, more particularly, to air-supported shoes or slider bearings loaded by magnetic forces for poising magnetic heads minute distances away from magnetizable surfaces of a rapidly rotating disc.

In connection with recording and reading coded data in the form of magnetic spots upon a magnetizable surface such as a rotating disc or drum, it is desirable to mount or bring the magnetic heads into very close proximity with the magnetizable surface without contact. If the magnetic heads contact the magnetizable surface, many deleterious effects may occur such as undue wear and damage of the magnetic heads and magnetizable surface. In many instances, the magnetizable surface is only a coating upon a supporting medium; hence, wear of this surface by a magnetic head could lead to complete damage in a relatively short period of time. While it may be comparatively simple to replace a magnetic head, the replacement of a disc or drum would be much more difficult and expensive.

Usually, the magnetizable surface is rotated or translated relative to a stationary magnetic head at very high speeds and, in order to prevent contact of the two members when in close proximity with each other, it would be necessary that the moving member be perfectly smooth and non-eccentric or that the stationary member be capable of following the irregularities and eccentricities of the moving member so as to be maintained in close proximity, but not in contact, with the moving member.

It is very costly and practically impossible to make a magnetizable surface such as in the form of a disc or drum which is perfectly uniform in thickness and concentricity. Accordingly, it appears to be more feasible and economical to provide for the magnetic head to follow the irregularities and eccentricities of the magnetizable surface.

Heretofore, various techniques have been employed for causing the magnetic head to be maintained in close proximity with the magnetizable surface without following the irregularities and eccentricities thereof. In some instances, the magnetic head had been held fixed and an adjustment was provided for minutely adjusting the clearance between the head and magnetizable surface; also, an adjustment was provided for pre-loading the bearings journaling the shaft for the disc or drum to reduce eccentricities.

Of course, these adjustments do not compensate for all conditions of irregularities and eccentricities. To achieve a more constant and uniform head to surface spacing, approaches have been taken where the head is caused to dynamically follow the irregularities and eccentricities with uniformity regardless of their degree.

It is with respect to this latter approach that this invention is directed and, more particularly, to an instance where the magnetizable surface exists on both sides of a disc and magnetic heads carried by air-supported shoes loaded by magnetic forces are available on both sides of the disc to record, read, and erase coded data in the form of magnetic spots in discrete concentric tracks on each surface, if so desired.

Further, this invention is an improvement over devices heretofore known for supporting opposed magnetic heads in a manner that the heads will follow the disc surface irregularities and eccentricities with a uniform clearance.

In order for the magnetic heads to dynamically follow the disc with uniform clearance for all relative positions, two actions are involved or, in other words, opposing forces are necessary to move the heads toward and away from the disc, respectively. Heretofore, where magnetic heads were disposed to each side of a rapidly rotating disc and with the magnetic heads mounted in a particular manner, air has been utilized to provide the stabilizing forces. Under the conditions just mentioned, the magnetic heads in head assemblies are individually biased away from the magnetizable surfaces of the disc and air supplied to the heads acts upon pistons in each head assembly to overcome the biasing force and, thereby, move the heads into their operative positions adjacent to the magnetizable surfaces. Also, a portion of the air supplied to the head assemblies was utilized to provide the opposing force for maintaining the uniform clearance between the heads and disc surfaces.

While this arrangement generally results in satisfactory operation with a very clean air supply, minute particles of dirt and other foreign substances will cause malfunction. It has been found that, to keep the air supply free from the various foreign particles, such as oil from an air compressor, is a very difficult and costly operation.

Furthermore, the air coming through the air supply duct creates an unbalanced load upon the magnetic head assemblies. The most desirable way of introducing the air into the head assemblies would be through the head assembly supporting elements; but, so far, no satisfactory solution for accomplishing this has been found. Also, in this latter arrangement, the head assemblies were caused to move in sockets and any slight cocking or canting of the head assemblies caused them to bind in the sockets.

By eliminating the need for an external air supply, the encumbrances attendant therewith are obviated. In the present invention, advantage is taken of the condition that the air surrounding the magnetizable surfaces of the rapidly rotating disc is disturbed or set in motion to form a film of air which follows in the direction of surface movement as the disc rotates. This film of air is utilized to provide one of the forces for maintaining the magnetic heads a fixed distance from the magnetizable surfaces regardless of eccentricities and surface irregularities. The other or opposing forces applied for creating a balanced condition, as will be seen later herein, are magnetic forces. The air disturbed by the rapidly rotating disc is caused to lubricate slider bearings or air-supported shoes which, through a proper mechanical system, will support the magnetic heads with close uniform spacing relative to the magnetizable surfaces upon the disc.

Utilizing an air film created by a rapidly moving member for supporting shoes carrying magnetic heads to maintain a uniform close spacing of the heads with respect to the surfaces of the moving member has been known heretofore. However, the fruition of the support available by the air film varies with the geometry of the shoes. Furthermore, for stability of the shoes, the load should be applied through pivots located at a particular distance along the length of the shoes. More particularly, and very importantly, the loading of the shoes should remain substantially constant over the range of the surface irregularities and eccentricities or run-out of the moving member.

In this invention, while the geometry of the shoes provides for very good load carrying capacities and the pivots are located in the proper position for stability of the shoes, the loading of the shoes remains substantially constant to provide uniform spacing of the magnetic heads from the disc surfaces. The constant loading of the shoes is achieved through a particular arrangement of the system for supporting the shoes. Essentially, the shoes are normally biased away from the surfaces of the moving member. The load is then applied to the shoes through a very low spring rate; i.e., by magnetic means; and, in this manner, the loading of the shoes is substantially constant.

In this invention, the slider bearings or shoes have a width-length ratio of approximately one and a novel arrangement is provided for applying constant loading thereon over the range of surface irregularities and eccentricities of the moving member. The shoes carry the magnetic heads and are supported by gimbal mountings attached at the ends of a pair of spaced beam springs pivotally mounted intermediate their ends upon knife edges. The beam springs are biased by a pair of springs to normally urge the oppositely disposed magnetic heads away from the surfaces of the moving member or disc. The magnetic heads are driven toward each other to be in close proximity with the disc surfaces against the opposing spring forces by magnetic means. Oppositely disposed armature elements are carried on each beam spring to extend therefrom into a coil disposed between and fixed with respect to the beam springs. When the coil is energized, the armature elements are attracted toward each other to seat together due to the magnetic flux generated by the coil. This action causes the magnetic heads to move toward and remain in close proximity with the magnetizable surfaces of the disc. The coil remains energized to provide constant loading on the shoes carrying the magnetic heads. The layer of air set in motion by the rotating disc cushions the magnetic heads quite nicely as they are brought rapidly toward the disc surfaces. The disturbed air then supports the shoes carrying the magnetic heads in the manner described hereinabove. The magnetic means applies the load to the shoes at a very low spring rate and the loading may be considered substantially constant. Also, by this arrangement, the magnetizable surfaces will not become damaged upon an electrical power failure because the beam springs are normally biased to hold the magnetic heads away from the disc surfaces.

Another feature of the invention is that the current for energizing the coil may be transmitted in such a manner that the heads will initially be driven very rapidly toward each other and then decelerate as they approach the disc surfaces. This type of control has not been feasibly employed in a system using air to drive the heads toward the disc.

Further, the magnetic heads are carried by shoes supported by gimbal mountings at the ends of beam springs, the head-supporting elements are not contained in sockets, as had been the practice where air was used to actuate the magnetic heads toward the disc surfaces. Hence, the possibility of having the head elements binding in the sockets is eliminated.

Also, because the beam springs are pivoted upon knife edges, the heads may be moved independent of each other or together in unison to be maintained a fixed distance from the disc surfaces. This arrangement permits the heads to follow the surface irregularities and eccentricities in a better manner than where the heads are only capable of moving independently as in devices known heretofore.

Further, in this invention, the magnetic heads, once positioned, are constrained from moving in the direction of adjacent recording tracks upon the disc surfaces. In this manner, less interference or signal noise is encountered and the timing of the signals will be more uniform. It is also important to realize that the magnetic means for providing constant loading on the shoes does not merely perform as an actuator but that it provides a constant loading upon the shoes so that the shoes will be uniformly spaced a minute distance from the rapidly moving disc surfaces by the disturbed air regardless of surface irregularities and disc eccentricities.

Accordingly, it is a prime object of this invention to provide an air-supporting shoe which is loaded in a manner that the loading thereof remains substantially constant.

Another object of this invention is to provide an air-supported shoe which has a high load carrying capacity.

A further object of this invention is to provide an air-supported shoe which is characterized by having a low mass.

Another further object of this invention is to provide an air-supported shoe disposed in close proximity with a moving member which is automatically retracted to a remote location upon failure of the loading means so as to prevent any damage to the moving member.

Still a further object of this invention is to provide an improved device for supporting and bringing an element into close proximity with a moving surface which supports said element in such a manner that the fluid medium surrounding and disturbed by the moving surface will poise the element a distance therefrom.

Still another object of this invention is to provide an improved device for supporting and bringing oppositely disposed elements into close proximity with opposite surfaces of a moving member which supports said opposing elements in such a manner that the fluid medium surrounding and disturbed by said moving member will poise the opposed elements a distance from the moving surfaces.

An additional object of this invention is to provide an improved device for supporting and bringing opposing elements into close proximity with opposite surfaces of a moving member disturbing a surrounding fluid medium to poise the opposed elements a distance from the movable surfaces which initially moves the opposing elements very rapidly toward each other and then decelerates the elements as they approach the moving surfaces.

Another object of this invention is to provide an improved device for supporting and bringing opposing elements into close proximity with opposite surfaces of a moving member which permits independent and unison movement of the opposing elements so that the elements have the facility for following the surface irregularities and eccentricities of the moving member without contacting the same.

Still another object of this invention is to provide an improved device for supporting and bringing opposing elements into close proximity with opposite surfaces of a moving member having concentric tracks thereon which will maintain the disposition of the opposing elements with respect to any one track of the concentric tracks so as to eliminate interference from adjacent tracks.

A further additional object of this invention is to provide an improved device for supporting and bringing opposing elements into close proximity with opposite surfaces of a moving member which carries said opposing elements in a manner that they can be moved freely toward the surfaces of the moving member.

Other objects of the invention will be pointed out in the following description and claims and illustrated in the accompanying drawings, which disclose, by way of examples, the principle of the invention and the best mode, which has been contemplated, of applying that principle.

Figure 3:
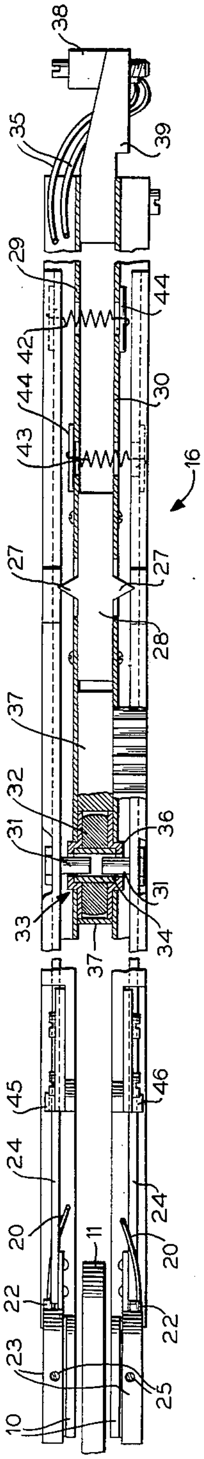
Figure 2:
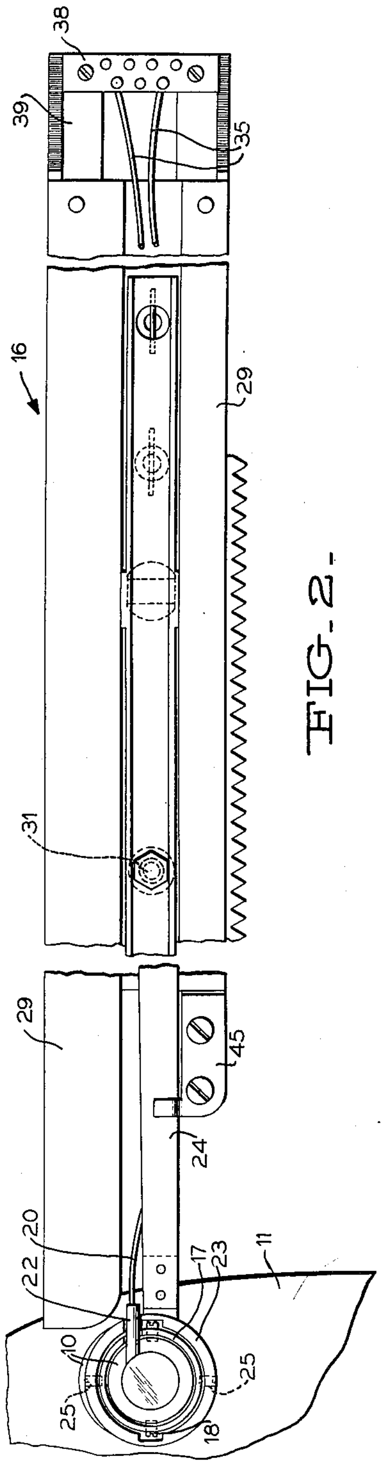
Figure 4:
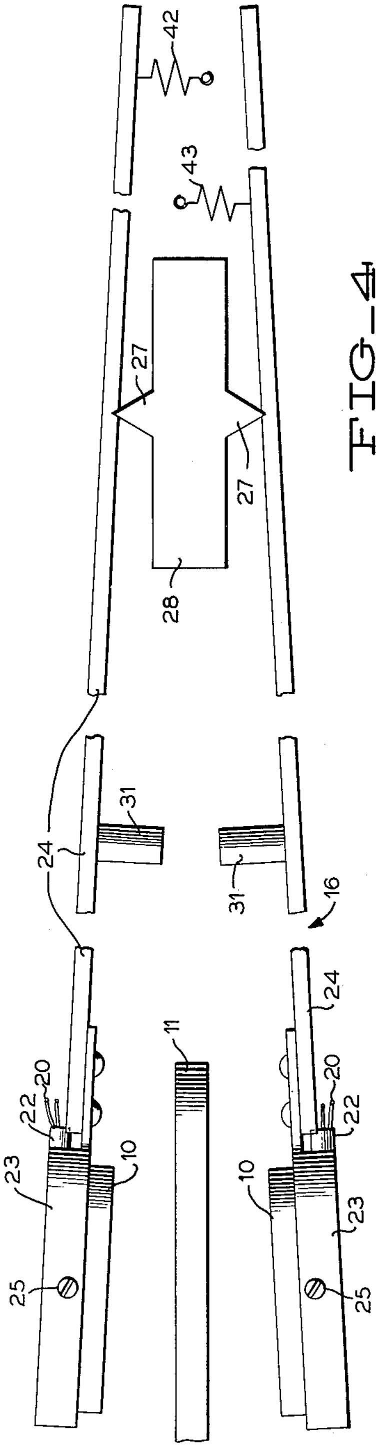
Figure 5:
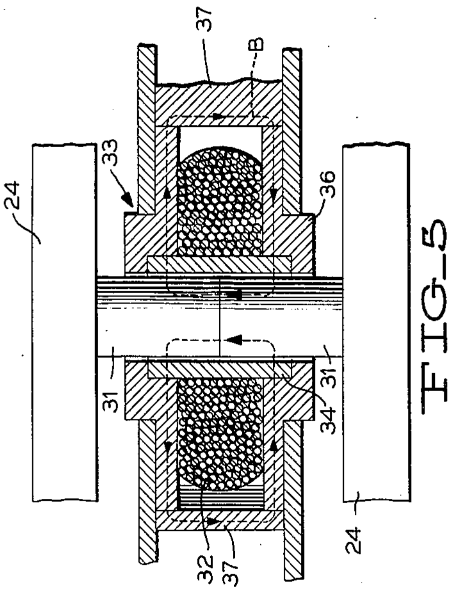
Figure 9:
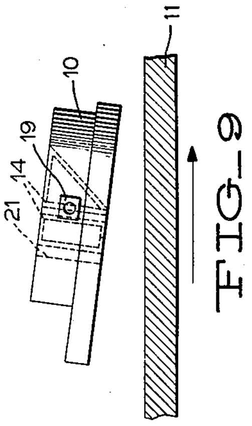
Figure 6:
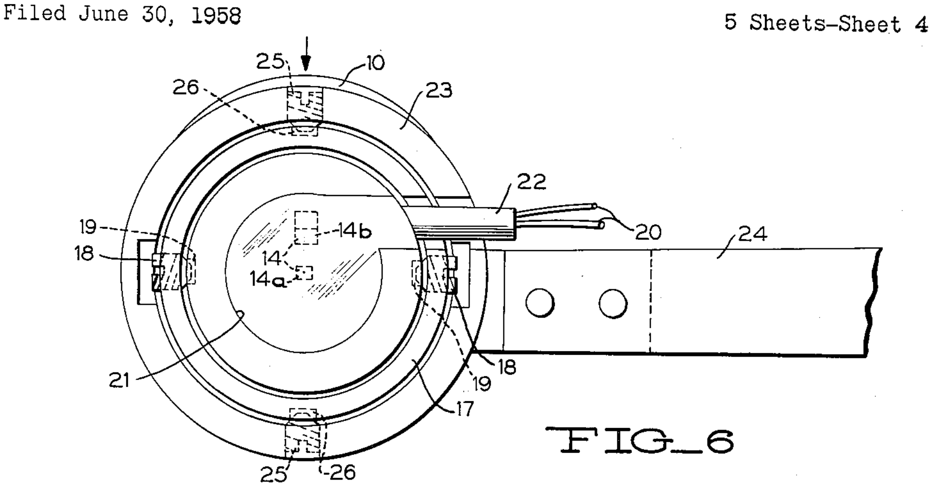
Figure 7:
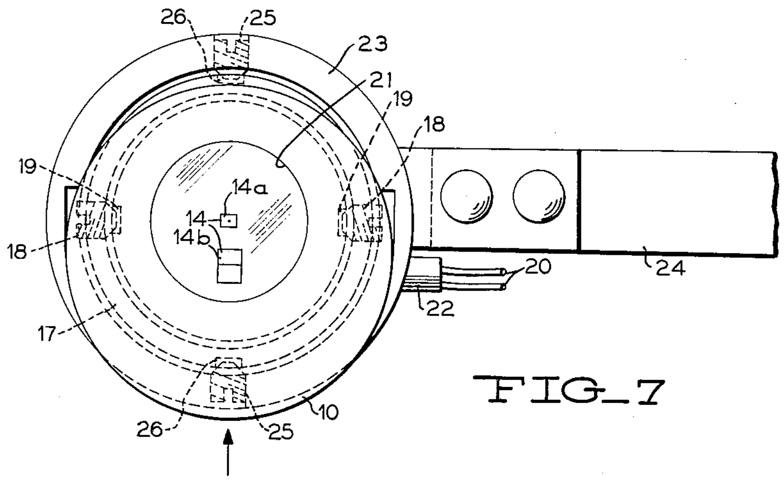
Figure 8:
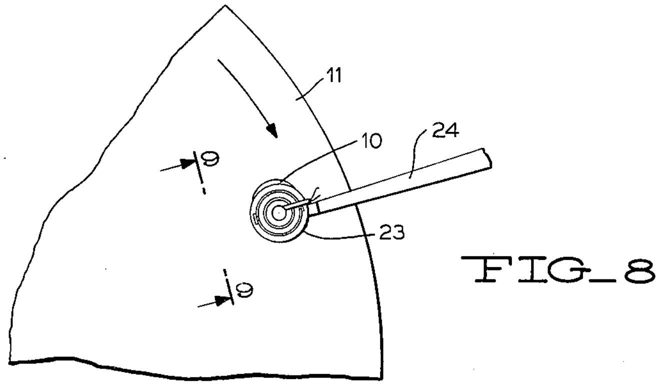
Figure 10:
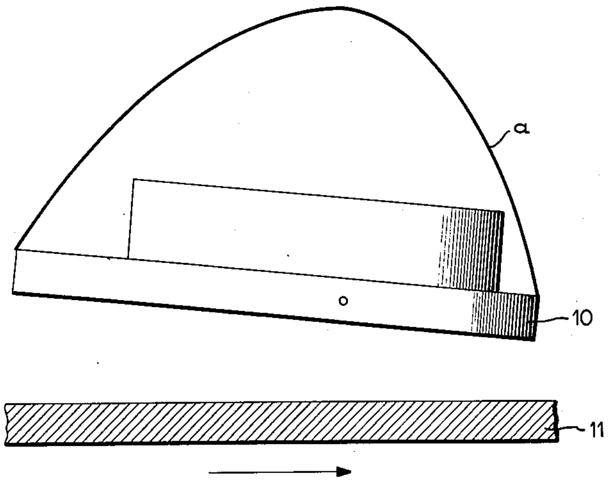
Figure 11:
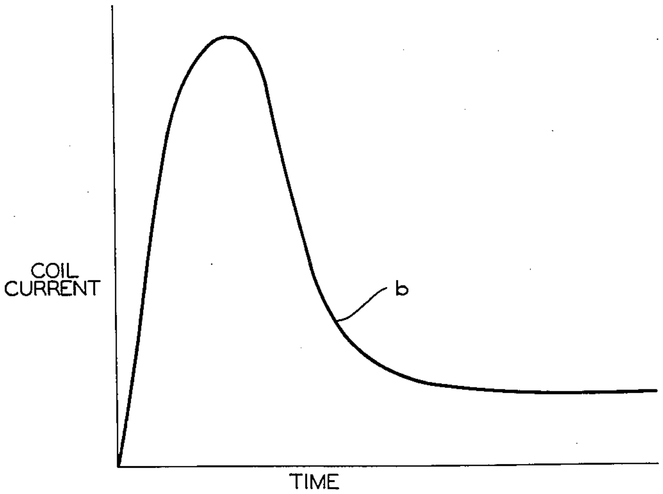

In the drawings:

FIG. 1 is a perspective view showing the relative positions of the support apparatus for the magnetic heads and the rapidly rotating discs, FIG. 2 is a plan view of the support apparatus, FIG. 3 is a front elevational view partially in section of the support apparatus, FIG. 4 is a schematic showing of the magnetic heads positioned away from the surfaces of the disc, FIG. 5 is an enlarged detail sectional view of the armature elements shown as being seated together and disposed within the coil, FIG. 6 is a top detail plan view of the mounting arrangement for one of the shoes carrying the magnetic heads, FIG. 7 is a detail bottom plan view of one of the shoes for carrying the magnetic heads, FIG. 8 is a schematic view showing the disposition of the shoe with respect to the rotating disc, FIG. 9 is a schematic view looking in the direction of the arrows on the line 9—9 in FIG. 8 to show the pivot position for the shoe and its attitude with respect to the rotating disc, FIG. 10 is a diagram of the fluid pressure distribution curve developed under the shoe, and FIG. 11 is a diagram of the coil current curve.

The phenomena involved with air-lubricated slider bearings or air-supported shoes has been described in various publications and, basically, it has been determined that there are three types of forces which must be considered in the hydro-dynamic analysis of a bearing configuration, namely, the forces due to viscosity, inertia, and pressure. Also, it has been found that pressure variations across the air film thickness are negligible. Furthermore, the fluid acceleration forces, generally, are negligible compared to viscous forces.

In slider bearing operation, it is necessary for the system to have adequate damping so that transients may be neglected. This will permit precise spacing of the bearing from the moving surface. Generally speaking, transients may be neglected when the mass of the element supported and the bearing surface have a resultant natural frequency which is very large compared to any operational disturbances.

When the slider bearing is properly pivoted, a wedge of air develops underneath the bearing surface or between it and the moving surface so that the bearing surface assumes a slightly inclined attitude. The angle of inclination is very small and with particular bearing geometry has been found to be of the order of approximately one minute of arc.

A criterion for equilibrium of the slider bearing, neglecting friction forces, is that the bearing pivot be located in the region of the center of pressure which may be derived mathematically. It has been found that the angle of inclination corresponding to a given film thickness increases as the location of the bearing pivot is moved from the center toward the rear of the shoe. A bearing pivot, located at approximately 60 percent of the length of the bearing from the leading edge thereof, places the pivot sufficiently close to the center of pressure to provide stable operation. This has proven to be satisfactory even when considering the effects of side leakage. When the bearing is properly pivoted, fluid pressure develops between the bearing and the moving surface and has a distribution as shown by curve *a* in FIG. 10.

The load carrying capacity of a slider bearing varies according to its physical dimensions or geometry when the speed of the moving surface, the film viscosity and pivot position are the same. The mass of the bearing should be very low to permit the best frequency response.

With reference to the drawings and particularly to FIG. 1, the invention is shown by way of example whereby shoes 10, only one shown, are disposed to each side or face of a disc 11 which is one of a plurality of discs 11 spaced from each other and rigidly attached to a shaft 12. The shaft 12 is suitably driven through a gear reduction mechanism 13 by a motor 15 and, in this example, at a speed of approximately 1240 revolutions per minute.

Each face of the discs 11 are coated with magnetizable material to facilitate magnetic recording thereon in a plurality of concentric circles or tracks. The shoes 10, which contain magnetic heads 14, as shown in FIG. 9, are selectively positionable through a support or access assembly 16, FIG. 1, so as to be disposed to each side of any one of the discs 11 adjacent any desired track thereon. The magnitudes of disc eccentricity, for example, have been about .030 of an inch, while surface irregularities have been about .001 of an inch over a two inch span. Under these conditions, the magnetic heads are to be maintained approximately .0003 to .0005 of an inch away from the magnetizable surfaces.

The magnetic heads 14 contained in the shoes 10 may be selectively positioned with respect to the concentric tracks on the discs 11 by mechanism as disclosed in the copending application of L. D. Stevens et al., Serial No. 477,468, filed December 24, 1954, wherein a magnetic transducer is selectively positioned in each of two dimensions; i.e., adjacent to a selected one of several members having a plurality of magnetic recording paths as well as adjacent to a selected one of said paths.

The shoes 10 have a profile as shown in FIG. 9 and each is pivotally mounted in a gimbal ring 17, FIGS. 6 and 7, by means of oppositely disposed cone pivots 18 which extend inwardly through the wall of the ring 17 and into jewels fixed in receiving recesses 19 in the shoe 10. As stated above, the ratio of shoe width to shoe length is approximately one and the pivots for the shoes are located .6 of the length thereof from the leading edge of the shoes 10. The leading edge of the shoe may be defined as the edge which first encounters the disturbed fluid medium or that edge facing the direction of rotation of the moving disc.

The magnetic heads 14 are disposed within bores 21, FIGS. 6, 7 and 9, extending through the shoes 10 normal to the pivot axis and are held in place by means of a suitable potting compound. A read-write head **14*a* is located in each shoe 10 and is approximately in line with the position of the shoe pivot axis and an erase head 14*b* in each shoe 10 is positioned slightly to the rear of the read-write head 14*a* when considering the leading edge of the shoe as a reference position. The leads 20 for the coils of the magnetic heads 14 in each shoe 10 are suitably connected to circuits, not shown, for supplying electrical impulses and extend through a short conduit tube 22 projecting outwardly from a side of the shoe 10 through a wall of the gimbal ring 17 and an adjacent wall of a concentric outer gimbal ring 23 which is fixedly attached by suitable means to one end of a tapered beam spring 24 and attached to the inner concentric gimbal ring 17 by means of oppositely disposed cone pivots 25 extending inwardly from the inner wall of the ring 23 into jewels contained in receiving recesses 26 in the ring 17, as shown in FIGS. 6 and 7. The pivot axis of the pivots 25 is at right angles to the pivot axis of the pivots 18. In this manner, the shoes 10** are able to assume their proper attitude with respect to the rapidly rotating disc surfaces and also be constrained against movement when positioned adjacent desired tracks on the disc surfaces.

The tapered beam springs 24 are pivotally mounted intermediate of their ends upon knife edge pivots 27 carried on or integral with a spacer block 28 which is fixed between frame members 29 and 30 of the access assembly 16, as shown in FIGS. 2 and 3. A straight portion of the beam springs 24, as well as the frame members 29 and 30, are channeled to reduce the mass of the assembly.

Armature elements 31 are fixedly attached to the beam springs 24 intermediate of the pivots 27 and the shoes 10 to extend therefrom, as shown in FIGS. 3 and 4. The armature elements 31 extend from the beam springs 24 into a coil 32 wound upon a spool assembly 33 formed by a residual member 34 and magnetic members 36 which embrace the residual member 34, as shown in FIG. 5. This spool assembly 33 is suitably supported in a bore extending through a block of magnetic material 37 which is interposed between the frame members 29 and 30. The block of magnetic material 37 completes the pathway B for the magnetic flux generated upon energization of the coil 32.

The leads 35 of the coil 32 extend through the block 37 and between the frame members 29 and 30 to a terminal block 38 attached to a bracket 39 fixed between the frame members 29 and 30, FIGS. 2 and 3.

The beam springs 24 are biased to hold the magnetic heads 14 out of close proximity with the disc surfaces by springs 42 and 43 attached thereto and to support pins 44 fixed to span bores in the frame members 29 and 30, respectively. Due to the fact that the spring 42 is required to overcome the force of gravity upon the beam spring 24, whereas the force of gravity aids the action of the spring 43, the spring 42 is placed further away from the pivots 27.

To limit the extent that the beam springs are urged away from each other by the springs 42 and 43, stop brackets 45 and 46 are fixed to the frame members 29 and 30, respectively, to engage the beam springs 24 and prevent any further outward movement thereof.

In operation of the mechanism, the discs 11 are caused to rotate at approximately 1240 revolutions per minute by means of the motor 15 and thereby disturb the surrounding air. With the disc rotating rapidly, the access assembly 16 is selectively positioned to bring the magnetic heads 14 to a particular disc and to lie adjacent to particular tracks on each side of the disc in the manner described in the above-mentioned Stevens et al. application, Serial No. 477,468.

After the magnetic heads are properly positioned the coil 32 may be energized by any suitable circuit to generate the flux path B, FIG. 5, whereby the armature elements 31 will move rapidly toward each other in opposition to the biasing force of the springs 42 and 43 and seat together, as shown in FIG. 5. The coil 32 remains energized and the armature elements 31 stay seated to provide a constant loading on the shoes 10 during the entire period of recording, reading and erasing magnetic spots upon the magnetizable disc surfaces. The coil 32 may be energized by an electric current which rises very rapidly and then falls off quite rapidly to a steady state, as represented by the curve *b*, FIG. 11, so as to initially move the magnetic heads 14 rapidly toward the disc surfaces and reduce the speed of movement as the heads come into close proximity with the disc surfaces.

The air disturbed by the rapidly rotating disc 11 first cushions the shoes 10 as they come into close proximity with the disc surfaces and then supports the shoes to hold them a minute, uniform distance away from the disc surfaces regardless of surface irregularities and disc eccentricities.

Upon de-energizing of the coil 32, the armature elements will unseat and the springs 42 and 43 will cause the beam springs 24 to move the magnetic heads 14 to a remote position or out of close proximity with the disc surfaces, a shown in FIGS. 3 and 4. The stop brackets 45 and 46 will arrest the beam springs 24 to hold the magnetic heads in the remote position. The residual member 34 serves to prevent the armature elements 31 from residing within the coil assembly 33 after the coil 32 is de-energized.

From the above, it is seen that the invention provides for supporting magnetic heads by air-supported shoes which are loaded with a constant force to effect a uniform spacing of the magnetic heads from rapidly moving magnetizable surfaces.

Further, the invention has been shown to provide an arrangement whereby the magnetic heads are automatically retracted to a remote position upon failure of the loading force so as to prevent any damage to the moving member.

Also, the invention has been shown to provide an arrangement of apparatus which exercises good control over the air-supported shoes carrying the magnetic heads.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a device of the class described comprising: a pair of spaced oppositely disposed support elements, first mounting means disposed intermediate the ends of said supporting elements for pivotally mounting the same, a rotatable disc having two surfaces and interposed between said support elements and to one side of said first mounting means, means for rotating said disc to form adhering surface air films, transducing elements carried by said support elements, second mounting means for mounting said transducing elements on said support elements in a manner to permit wedges of air to develop between the transducing elements and the disc surfaces when in close proximity of each other, biasing means for acting upon said support elements to normaly urge said transducing elements out of close proximity with said disc surfaces, a coil adapted to be electrically energized disposed between said support elements, armature elements attached to said support elements to extend therefrom into said coil, and means for selectively energizing said coil to attract said armature elements toward each other to position the transducing elements into close proximity with said disc surfaces whereby the wedges of air develop to exert opposing forces on said transducing elements to maintain the same at uniform distances from the disc surfaces.

2. In a device of the class described comprising: a pair of spaced oppositely disposed support elements, first mounting means disposed intermediate the ends of said supporting elements for pivotally mounting the same, a rotatable disc having two surfaces and interposed between said support elements and to one side of said first mounting means, means for rotating said disc to form adhering surface air films, transducing elements carried by said support elements, second mounting means for mounting the transducing elements asymmetrically on said support elements to permit the same to attain an angular attitude to said disc surfaces when in close proximity therewith and acted upon by the adhering surface air films moving therepast, biasing means for acting upon said support elements to normally urge said transducing elements out of close proximity with said disc surfaces, a coil member positioned between said support elements and adapted to be energized electrically so as to set up a magnetic field therearound, armature elements attached to said support elements to extend therefrom into said coil, and means for selectively energizing said coil to attract said armature elements toward each other in opposition to said biasing means to position the transducing elements into close proximity with said disc surfaces whereby the adhering surface air films exert forces upon said second mounting means to maintain the transducing elements at uniform distances from the disc surfaces.

3. In a device of the class described comprising: a pair of spaced oppositely disposed support elements each having two ends, knife edge mounting elements positioned intermediate the ends of said support elements for pivotally mounting the same, a rotatable disc having two surfaces and positioned between said support elements to one side of said knife edge mounting elements, means for rotating said disc to form adhering surface air films, transducing elements, gimbal elements for mounting said transducing elements on said support elements so as to enable a wedge of air to form between said transducing elements and said disc surfaces, spring elements disposed to act upon said support elements so as to normally urge said transducing elements away from said disc surfaces, a coil positioned between said support elements and adapted to be electricaly energized to set up a magnetic field therearound, armature elements attached to said support elements to extend therefrom so as to be under the influence of said magnetic field, and means selectively operable for energizing said coil to attract the armature elements toward each other in opposition to the urging of said spring elements to urge the transducing elements into close proximity with said disc surfaces.

4. In a device of the class described comprising: a pair of spaced, oppositely disposed support elements each having two ends, knife edge mounting elements positioned intermediate the ends of said support elements for pivotally mounting the same, a rotatable disc having two surfaces and positioned between said support elements to one side of said knife edge mounting elements, means for rotating said disc to form adhering surface air films, transducing elements, first gimbal rings fixed to each of the support elements at one end of the ends thereof, second gimbal rings pivotally mounted to said first gimbal rings to be concentric therewith, means for pivotally mounting said transducing elements within said second gimbal rings so as to enable said transducing elements to attain an angular attitude to said disc surfaces by action of the adhering surface air films therebetween, spring elements disposed to act upon said support elements so as to normally urge said transducing elements away from said disc surfaces, a coil positioned between said support elements and adapted to be electrically energized to set up a magnetic field therearound, armature elements attached to said support elements to extend therefrom so as to be under the influence of said magnetic field and means selectively operable to energize said coil to attract said armature elements toward each other in opposition to the urging of said spring elements to urge the transducing elements into close proximity with said disc surfaces.

5. In a device in the class described comprising: a pair of spaced oppositely disposed support elements each having two ends, knife edge mounting elements positioned intermediate the ends of said support elements for pivotally mounting the same, a rotatable disc having two surfaces and positioned between said support elements to one side of said knife edge mounting elements, means for rotating said disc to form adhering surface air films, first gimbal elements fixedly attached to said support elements at one of the ends thereof, second gimbal elements, means for pivotally mounting said second gimbal elements within and concentric with said first gimbal elements, transducing elements, shoe elements carrying said transducing elements within the perimeters thereof, means for pivotally mounting said shoe elements within said second gimbal elements so as to permit wedges of air to develop between the shoes and the surfaces of the rotating disc, spring elements disposed to act upon said support elements so as to normally urge said shoe elements away from said disc surfaces, a coil positioned between said support elements and adapted to be electrically energized to set up a magnetic field therearound, armature elements attached to said support elements to extend therefrom into said coil, and means selectively operable for energizing said coil to attract said armature elements toward each other in opposition to the urging of said spring elements to urge the transducing elements into close proximity with said disc surfaces whereby the wedges of air exert opposing forces on said shoes to maintain the transducing elements at uniform distances from the disc surfaces.

References Cited in the file of this patent

UNITED STATES PATENTS

| | | |
|---|---|---|
| 2,537,657 | D'Humy et al. | Jan. 9, 1951 |
| 2,545,363 | Kenney | Mar. 13, 1951 |
| 2,772,135 | Hollabaugh | Nov. 27, 1956 |
| 2,862,781 | Baumeister | Dec. 2, 1958 |
| 2,863,004 | Maclay et al. | Dec. 2, 1958 |
| 2,886,651 | Vogel | May 12, 1959 |
| 2,891,797 | Hull et al. | June 23, 1959 |

FOREIGN PATENTS

| | | |
|---|---|---|
| 651,016 | Great Britain | Mar. 7, 1951 |